May 29, 1956 R. J. TIERNEY 2,747,310
IDENTIFICATION MEANS PARTICULARLY FOR A LUGGAGE HANDLE
Filed July 13, 1953
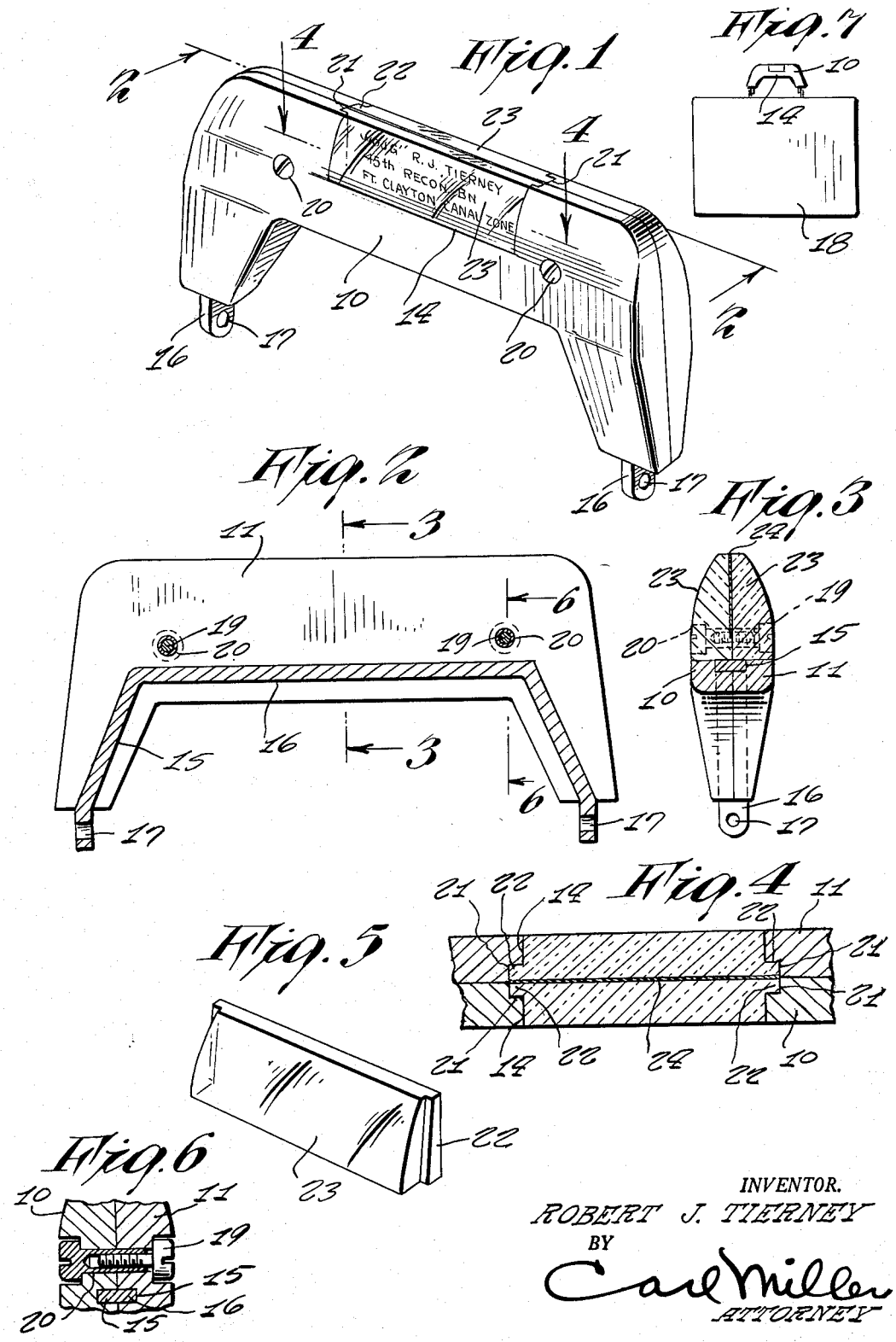
INVENTOR.
ROBERT J. TIERNEY
BY
Carl Miller
ATTORNEY United States Patent Office 2,747,310
Patented May 29, 1956

2,747,310
IDENTIFICATION MEANS PARTICULARLY FOR A LUGGAGE HANDLE

Robert J. Tierney, Fort Lewis, Wash.

Application July 13, 1953, Serial No. 367,453

1 Claim. (Cl. 40—10)

This invention relates to identification means and more particularly to a combination identification means and handle.

It is an object of the present invention to provide a combination identification means and handle wherein the identification card is visible from both sides of the handle. It is another object of the present invention to provide means for mounting an identification tag in the handle of a piece of luggage or the like rather than on an attached tag which may become detached through use or deliberately removed. Other objects of the present invention are to provide a combination identification means and handle bearing the above objects in mind which is of simple construction, inexpensive to manufacture, has a minimum number of parts, is easy to use and efficient in its intended purpose.

For other objects and a better understanding of the invention reference may be had to the following detailed description taken in connection with the accompanying drawing, in which:

Figure 1 is a perspective view of the invention;

Fig. 2 is a longitudinal sectional view taken along the line 2—2 of Fig. 1;

Fig. 3 is a transverse sectional view taken along the line 3—3 of Fig. 2;

Fig. 4 is a transverse sectional view taken along the line 4—4 of Fig. 2;

Fig. 5 is a perspective view of one of the windows for the identification card;

Fig. 6 is a transverse sectional view taken along the line 6—6 of Fig. 2;

Fig. 7 is a side elevational view of a luggage showing the invention applied thereto.

Referring now to the figures, 10 and 11 represent a pair of handle halves of colored plastic or other suitable material identical in size and shape but of opposite hand, the upper edges of each of the halves being provided with a rectangular cut out 14. The inner faces of the halves 10 and 11 are each provided with transversely aligned, substantially U-shaped grooves 15 which cooperate to receive therewithin a securing member 16 of cold drawn steel or other suitable material, the two ends of the securing member 16 being provided with openings 17 to facilitate the attachement thereto of a luggage 18 (Fig. 7) or other items, not shown, for example a tool box, a golf bag or a portable typewriter case. The halves 10 and 11 are secured together by means of a pair of screws 19 (Fig. 6) and female members 20, substantially as illustrated. The outer faces of the halves 10 and 11 are provided with countersunk openings, which receive the slotted heads of the screws 19 and the female members 20.

The havles 10 and 11 at the opposite ends of the cut outs 14 are provided with vertically extending upwardly tapered slots 21 which lockingly receive the correspondingly shaped ends 22 of a pair of cooperating transparent plastic windows 23 (Fig. 5), an identification card 24 being positioned intermediate the windows 23. The owner's name, address or the like will be printed on both sides of the card 24. It will be noted that the windows 23 are prevented from becoming disengaged from the handle halves 10 and 11 by the tapered ends 22 which produce a locking effect and preventing upward movement. It will be noted that the screws receiving members 20 will be substantially invisible due to the colored opaque plastic material of halves 10 and 11. The entire device is assembled and retained by means of the two screws 19 and two female members 20, permitting easy removal by the owner and the changing of the card 24. With the exception of the screws 19 and the members 20, the right and left hand parts are identical, effecting an economy of time and labor during production.

While various changes may be made in the detail construction, it shall be understood that such changes shall be within the spirit and scope of the present invention as defined by the appended claim.

Having thus set forth and disclosed the nature of my invention, what is claimed is:

An identification means comprising a pair of complementary handle halves, means for releasably securing said halves together, each of said halves having along their upper longitudinal edges transversely aligned cut outs, a transparent window disposed within each of said cut outs, means for securing said window to the corresponding of said handle halves, identification means disposed intermediate said transparent windows, and the said means for securing said window within its corresponding cut out comprising said handle halves having at the end of said cut outs a vertical, upwardly tapered groove and the said window having a complementary shaped tapered end to fit within said groove, thereby locking said window in said cut out against transverse, as well as sliding upward movement.

References Cited in the file of this patent
UNITED STATES PATENTS

| 1,807,288 | Herbert | May 26, 1931 |
| 2,390,053 | Bradford | Dec. 4, 1945 |
| 2,496,008 | Jablon | Jan. 31, 1950 |
| 2,505,250 | Kime | Apr. 25, 1950 |
| 2,506,509 | Kratkowski | May 2, 1950 |
| 2,516,243 | Murphy | July 25, 1950 |
| 2,585,331 | King | Feb. 12, 1952 |
| 2,678,707 | Finkelstein | May 18, 1954 |